US012322210B2

(12) United States Patent
Celestini

(10) Patent No.: US 12,322,210 B2
(45) Date of Patent: Jun. 3, 2025

(54) COMPUTER-AIDED IDENTIFICATION OF ERGONOMIC RISK

(71) Applicant: Pacefactory Inc., Oakville (CA)

(72) Inventor: Stefano Celestini, Oakville (CA)

(73) Assignee: PACEFACTORY INC., Oakville (CA)

( * ) Notice: Subject to any disclaimer, the term of this patent is extended or adjusted under 35 U.S.C. 154(b) by 308 days.

(21) Appl. No.: 18/105,151

(22) Filed: Feb. 2, 2023

(65) Prior Publication Data

US 2023/0177883 A1   Jun. 8, 2023

(51) Int. Cl.
    G06K 9/00    (2022.01)
    G06V 20/40   (2022.01)
    G06V 40/20   (2022.01)

(52) U.S. Cl.
    CPC .............. G06V 40/23 (2022.01); G06V 20/41 (2022.01)

(58) Field of Classification Search
    CPC ......... G06V 40/23; G06V 20/41; G06V 20/52
    See application file for complete search history.

(56) References Cited

U.S. PATENT DOCUMENTS

| 2008/0109271 | A1 | 5/2008 | Smith |
| 2010/0094645 | A1 | 4/2010 | Carroll |
| 2011/0050878 | A1 | 3/2011 | Wells |
| 2019/0021652 | A1 | 1/2019 | Arandia |
| 2021/0298644 | A1 | 9/2021 | Chen |

FOREIGN PATENT DOCUMENTS

| CN | 105956549 A    | 9/2016 |
| CN | 112101180 A    | 12/2020 |
| KR | 101723283 B1   | 4/2017 |
| KR | 102344107 B1   | 12/2021 |
| WO | 2020210004 A1  | 10/2020 |

OTHER PUBLICATIONS

Intenseeye, AI-powered workplace safety accessible at <https://www.intenseye.com/>.
TuMeke Ergonomics, Ergonomics Everywhere accessible at <https://www.tumeke.io/>.

*Primary Examiner* — Dhaval V Patel
(74) *Attorney, Agent, or Firm* — CRGO Global; Steven M. Greenberg

(57) ABSTRACT

Artificial intelligence and computer vision analysis is used to generate ergonomics-annotated human forms and location histories in a video sequence. Video images are analyzed to identify human forms and generate a wireframe representing each human form, which is then analyzed to identify ergonomic risks which can be ranked according to severity. Severity markings for the ergonomic risks are superimposed on a location history of the human form to show the history, and the severity markings may also be superimposed on the human form, for example on a superimposed representation of the wireframe, by body region (e.g. neck, lower back). Optionally, where the human form represents a worker or other individual having planned activities, the ergonomic risks can be compared to a task flow for the worker to determine whether the ergonomic risks occurred during the planned activities or during unplanned activities.

21 Claims, 6 Drawing Sheets

COMPUTER-AIDED IDENTIFICATION OF ERGONOMIC RISK

BACKGROUND OF THE INVENTION

Field of the Invention

The present disclosure relates to automated computer-driven video surveillance analytics, and more particularly to generating ergonomics-annotated human forms and location histories in a video sequence.

Description of the Related Art

With video surveillance or monitoring, the typical purpose is to capture an event and use this information to visually identify an individual doing something that they should not be doing (e.g. a violation of law, organizational policy or safety rules).

Some such imagery may be used for coaching and training rather than for discipline, by providing examples to illustrate a topic using informative annotations that are relevant to the teaching. For example, imagery showing a safety violation and/or imagery showing proper safety procedures may be used as part of a safety training program.

A particular subset of safety concerns is ergonomic safety. Broadly speaking, ergonomic safety involves managing the interaction of a person with their environment so as to minimize the risk of injury resulting from poor movement technique. While in some cases less acute than safety concerns relating to physical workplace trauma, such as such as losing a limb to a machine, ergonomic safety is still of great importance. A single instance of improper lifting technique, for example, can lead to serious soft tissue injuries to the back. Even where the injury is not immediate, improper movement technique over time can lead to damage, such as repetitive strain injury.

Conventional ergonomic analysis and design is typically directed to planned activities-those things that a worker is expected to do as part of his or her assigned tasks. If it is known in advance, for example, that a worker may need to retrieve items from a high shelf, a step stool or other aid can be provided and the worker can be instructed to use the same to avoid unsafe reaching. However, it is difficult to do much beyond providing general guidance for activities that are not part of the anticipated workflow, and using video surveillance or monitoring in the hope of identifying and correcting problems after they occur.

Manual review of video surveillance imagery to identify ergonomically non-compliant behaviour is time-consuming, tedious and error-prone. While some automated video analytic tools exist, they are susceptible of improvement in enabling identification and review of ergonomic risks by a human reviewer.

BRIEF SUMMARY OF THE INVENTION

In one aspect, a computer-implemented method for generating ergonomics-annotated human forms and location histories in a video sequence comprises receiving a video sequence comprising a plurality of images representing a scene, analyzing the images to identify at least one human form of a respective human within the scene, generating a body wireframe for each human form within the scene in each one of the images, analyzing each body wireframe for each image to identify at least one ergonomic risk factor, tracking movement of each human form within the scene, for each human form within the scene, superimposing a respective footprint on each of the images, wherein the respective footprints combine to represent a location history of the respective human form within the workspace in the video sequence, and, for each ergonomic risk factor, annotating the video sequence with the respective ergonomic risk factor at time of occurrence within the video sequence, wherein a first annotation for the respective ergonomic risk factor is associated with the respective human form in the video sequence and a second annotation for the respective ergonomic risk factor is associated with the respective location history in the video sequence.

The method may further comprise assigning a severity level to the ergonomic risk factor(s), wherein at least one of the first annotation and the second annotation include annotation of the severity level.

The method may further comprise, for at least one of the ergonomic risk factor(s), comparing the tracked movement of the respective human form to a set of planned activities of the human represented by the respective human form, determining, from the comparison, whether the tracked movement of the respective human form is within scope of the set of planned activities, and responsive to the determination, further annotating the video sequence with a third annotation to indicate whether the respective ergonomic risk factor occurred during unplanned activities.

The video sequence may be one of a real time video sequence and a previously stored video sequence.

In a preferred embodiment, the video sequence is captured from a fixed angle.

The location history may be one of a motion trail and a heat map.

The method may further comprise superimposing the body wireframe on each human form within the scene in each image.

In other aspects, a computer program product and a data processing system for implementing the above described methods are provided Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
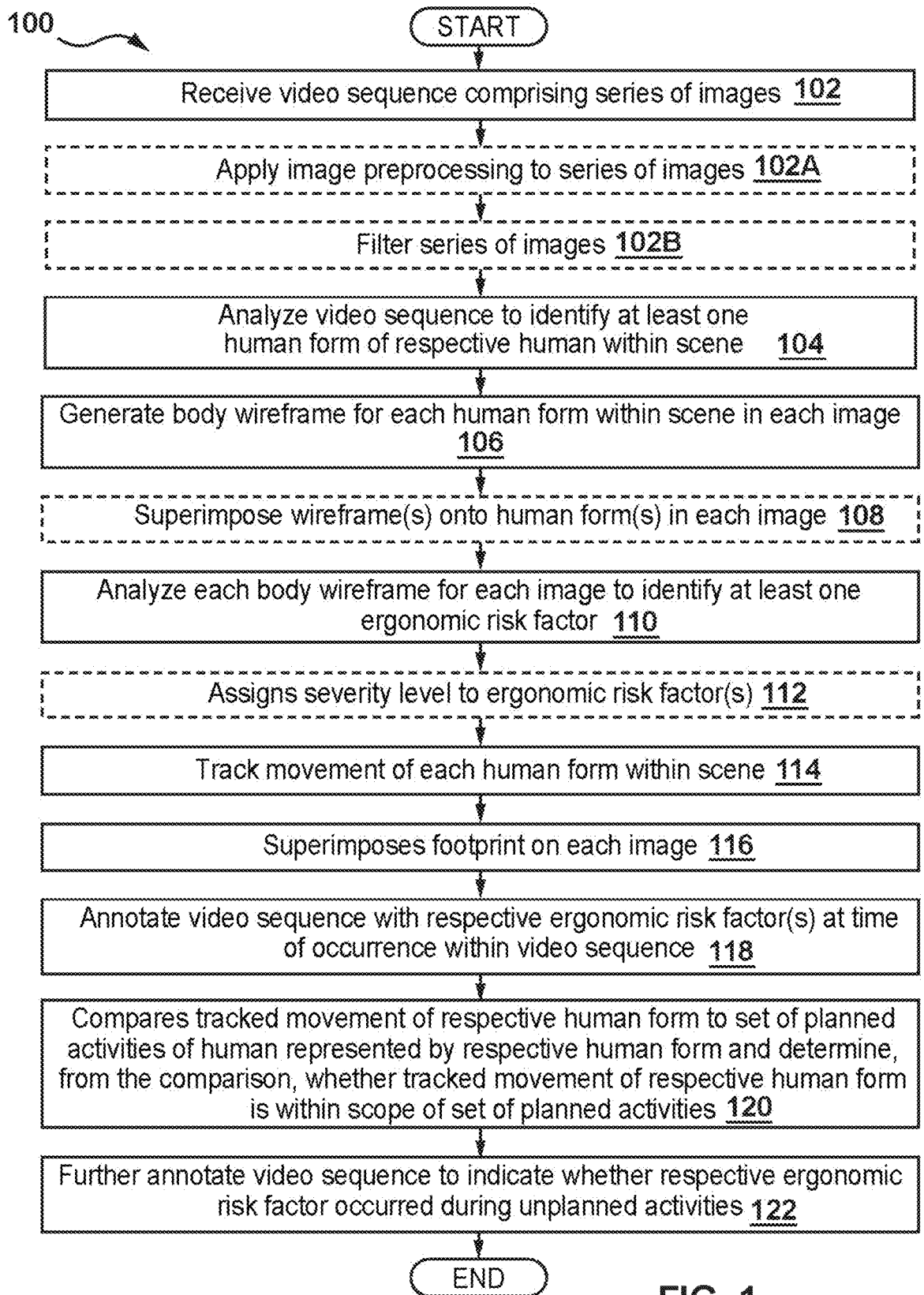
FIG. 1 is a flow chart showing an illustrative computer-implemented method for generating ergonomics-annotated human forms and location histories in a video sequence.

Reference is now made to FIG. 1, which shows an illustrative computer-implemented method 100 for generating ergonomics-annotated human forms and location histories in a video sequence. At step 102, the method 100 receives a video sequence comprising a plurality of images representing a single common scene. Preferably, the video sequence is captured from a fixed angle so that the scene is a fixed scene in the sense that while elements within the scene may be moving, the camera capturing the scene is not actively panning or zooming. In alternate embodiments, however, the scene may be captured from a moving perspective, for example by a camera that is panning or is mounted on a moving vehicle, e.g. a drone. The video sequence comprises an ordered series of images and may be, for example, a real time video sequence, or a previously stored video sequence, and may comprise a continuous motion video with a relatively high frame rate or a discontinuous motion video with a relatively lower frame rate (e.g. stop motion). The scene represented in the video sequence may be, for example, all or part of: a production area (e.g. in a factory), a warehouse, a shipping/receiving area, an outdoor storage yard, a construction site, a parking area, a site of a special event (e.g. a carnival or festival or the stage of a theatrical performance, including a concert with dancing), among others. Any video sequence, representing any scene for which ergonomic analysis is to be performed, may be used.

Before proceeding to steps 104 and 106, at optional step 102A the method 100 applies image preprocessing to the series of images, and at optional step 102B the method 100 filters the series of images. Thus, in a preferred embodiment steps 104 and 106 occur after pre-processing the series of images at optional step 102A and/or filtering the series of images at step 102B. Filtering the series of images at step 102B may comprise, for example, adjusting an intensity threshold for the images, adjusting a minimum size threshold for images, adjusting a maximum size threshold for the images, blurring the images, summing differences and/or averaging features across a plurality of images.

An intensity threshold can be used to ignore or filter out regions of an image that are not bright enough. For example, an intensity threshold may specify that any regions that are below 30% of the maximum image brightness are to be ignored. An intensity threshold may also filter changes in lighting and shadows that may interfere with the confidence of ergonomic detection (as discussed further below), or to remove from consideration video sequences from times of the day where sunlight may affect the resulting accuracy of the system. The image itself does not need to be photographic. It may be an already processed image, such that brightness corresponds to the amount of motion in a given region. In this case, an intensity threshold would have the effect of filtering out regions based on the amount of motion.

A minimum size threshold could be applied while looking for human individuals in an image. If a human individual is known to be present in the image but is not detected, the minimum image size may need to be increased to better implement steps 104 and 106. This allows the software to keep track of human individual while maximizing the speed of the algorithm.

Similarly to the minimum size threshold, a maximum size threshold can be used to reduce images which are too large. For example, a maximum size threshold may specify that all images are 480×320. A maximum size threshold can help reduce processing time while maintaining accuracy.

Blurring may be used to increase the effect of hiding identity in case the overall shape and/or texture of the objects is overly preserved by previous processing stages. Alternatively, blurring can help with ignoring video noise artifacts which may aid early stages of processing.

Where filtering the series of images at step 102B comprises adjusting an intensity threshold, the code from OpenCV (Open Source Computer Vision) available at https://docs.opencv.org/3.4/d7/d4d/tutorial_py_thresholding.html may be used; this code is incorporated herein by reference. If the image filtering at step 102B comprises blurring the image(s), the code from OpenCV (Open Source Computer Vision) provided at https://docs.opencv.org/3.1.0/d4/d13/tutorial_py_filtering.html and incorporated by reference herein may be used. Summing frames may be carried out using the code published by SciPy.org at https://docs.scipy.org/doc/numpy-1.14.0/reference/generated/numpy-.sum.html, which is incorporated herein by reference. Difference frames themselves can be calculated using the OpenCV function absdiff available at https://docs.opencv.org/3.0-beta/modules/core/doc/operations_on_arrays.html#absdiff, incorporated herein by reference.

At step 104, the method 100 analyzes the video sequence to identify at least one human form of a respective human within the scene, and at step 106, the method 100 generates a body wireframe for each human form within the scene in each image. Depending on the implementation, in some embodiments steps 104 and 106 may be combined into a single step. Steps 104 and 106 are collectively referred to as application of a pose estimation model. A pose estimation model is a machine learning model (e.g. a deep learning model) trained on a dataset with many labeled images of individuals. Examples of suitable open source implementations of pose estimation models for generating a body wireframe for each human form in a video sequence include MoveNet, available at the URL https://github.com/tensorflow/hub/blob/master/examples/colab/movenet.ipynb and at the URL https://www.tensorflow.org/hub/tutorials/movenet, and PoseNet, which is available at the URL https://github-.com/tensorflow/tfjs-models/tree/master/posenet, each of which is incorporated by reference. Both of these are part of the TensorFlow platform. These are merely non-limiting examples, and any suitable pose estimation model may be used.

In one preferred embodiment, MoveNet is used to implement steps 104 (analyze the image(s) to identify at least one human form of a respective human within the scene) and 106 (generate a body wireframe for each human form within the scene). MoveNet includes a feature extractor with four prediction heads attached thereto. The prediction heads compute in parallel. A prediction head for a "person center heat map" predicts the geometric center of instances of human forms, a prediction head for a "keypoint regression field" predicts a full set of keypoints for a human form and is used for grouping keypoints into instances, a "person keypoint heat map" predicts the location of all keypoints, independent of instances of human forms, and a "2D per-keypoint offset field" prediction head predicts local offsets from each output feature map pixel to the precise sub-pixel location of each keypoint. The term "keypoint", as used in this context, refers to a feature or feature category that contains or embodies information to be used to calculate body position of the human form, and will typically be a predetermined point on the human body, such as (but not limited to) a joint. Examples of feature categories within an image or images include a wrist, elbow, neck, back, nose, etc. Thus, one predetermined feature may be "right shoulder" and, where an image included, for example, that right shoulder, the right shoulder where identified could become a classified feature. These are merely illustrative examples and are not limiting.

The "person center heat map" prediction head identifies the geometric center of each human form within the scene, that is, the arithmetic mean of all keypoints belonging to that human form, by selecting the location with the highest score (based on weighting by the inverse-distance from the image center).

The "keypoint regression field" prediction head generates an initial set of keypoints for each human form by slicing the keypoint regression output from the pixel corresponding to the center of the human form.

The "person keypoint heat map" multiplies each pixel in the keypoint heat map by a weight that is inversely proportional to the distance from the corresponding regressed keypoint to reduce the likelihood of accepting keypoints from other human forms in the background, which will usually be distant from regressed keypoints and therefore have low scores.

The final set of keypoint predictions are selected by retrieving the coordinates of the maximum heat map values in each keypoint channel, to which the predictions from the "2D per-keypoint offset field" prediction head are added. This provides refined estimates of the keypoints. The set of keypoints for each human form in each image can then be recorded in a datastore. Thus, the keypoints are recorded per human form, per image. Any or all of the keypoints of an identified human form in the scene can be combined over a number of sequential images (frames) to determine a motion path of that identified keypoint or set of keypoints.

A wide range of pose estimation models may be applied at step 106, depending on the keypoint(s) that are to be categorized. For example, step 106 may apply one or more of lateral view pose estimation models (adapted for a lateral or "side-on") view of a human or group of humans, or an elevated view pose estimation model (adapted for an elevated or top perspective view of humans or groups of humans).

The keypoints for each human form constitute a wireframe of the human form; that is, notional straight lines connecting the keypoints will form a stick figure or wireframe representing the pose of that human form. The sophistication of the wireframe will depend on the number of keypoints.

Figure 2A:
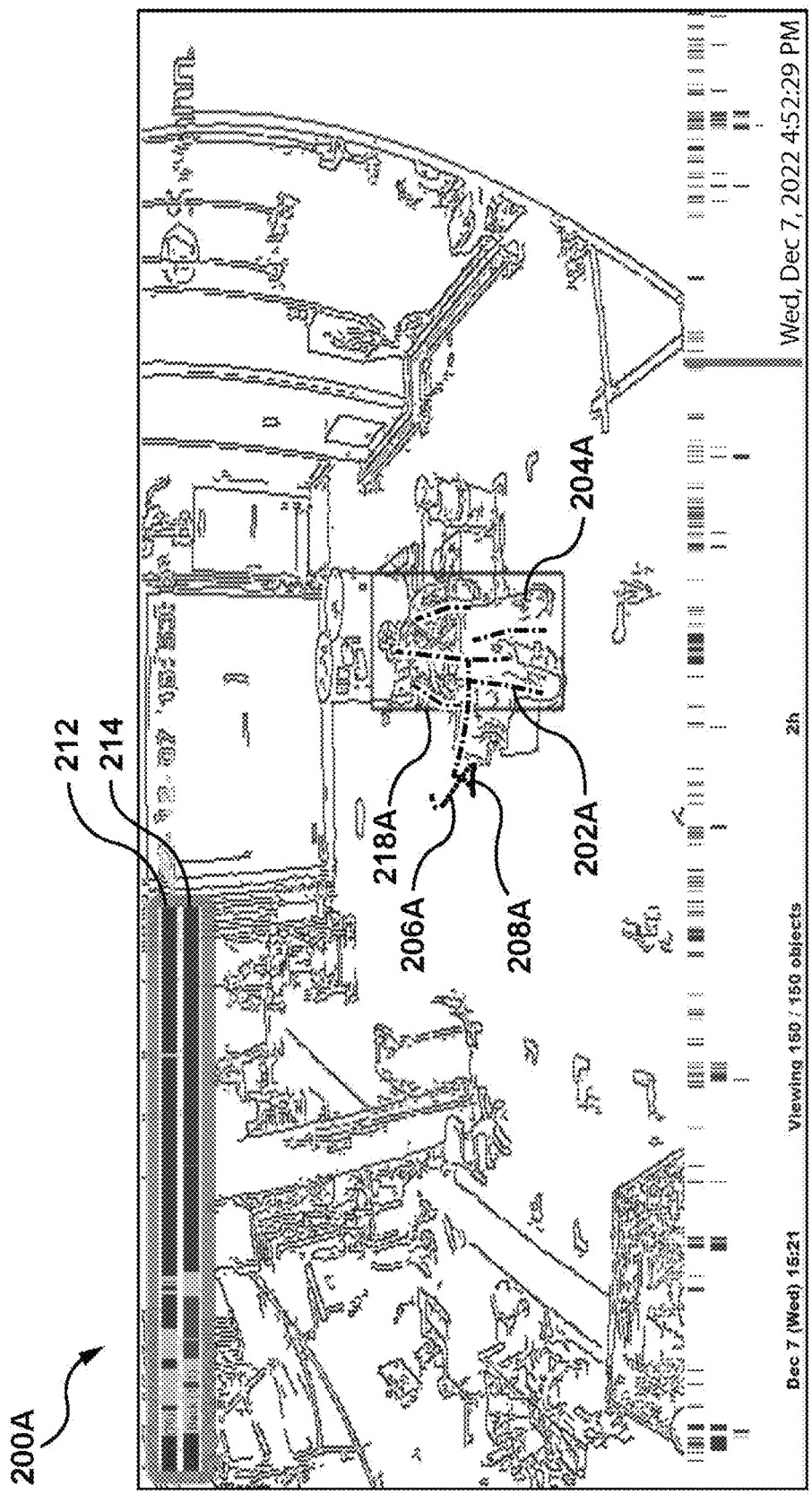
FIGS. 2A, 2B and 2C and 2B each show a respective image of an illustrative video sequence processed according to the method of claim 1.
Figure 2B:
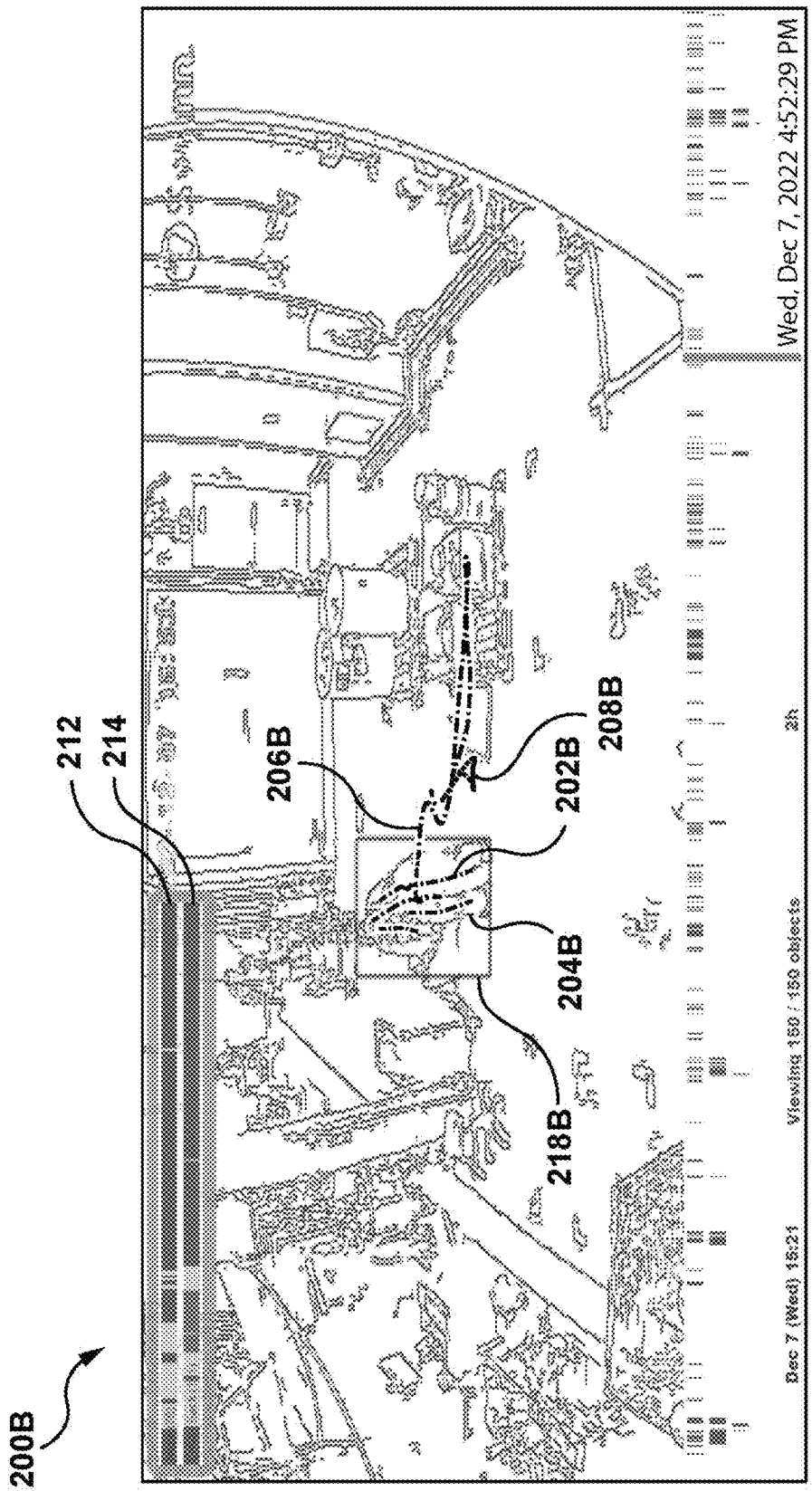

At optional step 108, the method 100 may superimpose the wireframe(s) generated at step 106 onto the human form(s) in each image of the video sequence; alternatively the wireframe(s) may be used only for analysis without being displayed. FIGS. 2A and 2B each show a respective image 200A, 200B of a video sequence processed according to the method 100 in FIG. 1. In each image 200A, 200B, a respective wireframe 202A, 202B is superimposed on a respective human form 204A, 204B. The image 200B in FIG. 2B occurs later in the video sequence than the image 200A in FIG. 2A.

Next, at step 110, the method 100 analyzes each body wireframe for each image to identify at least one ergonomic risk factor. Step 110 can be carried out by, for each human form in each image, calculating the simple angles between each stored keypoint and its adjacent keypoints, and then calculating combination angles representing juxtapositions of angles of various body portions to one another. For example, an elbow angle is a simple angle, and is calculated from the keypoints for the wrist, elbow and shoulder on that side of the body wireframe. Another example of a simple angle, although the calculation is more involved, is torso twist, which can be determined by calculating a first line between the keypoints for the hips and a second line between the keypoints for the shoulders, and then determining an angle between the hip line and the shoulder line. Combination angles typically involve the juxtaposition of two anatomical angles. An example of a combination angle is the juxtaposition of lower back angle and knee angle: if the lower back is bent while the knees are bent, this is a lower ergonomic risk than a bent back with straight knees. These combination angles can also be checked. All points can be mathematically correlated to a defined ergonomic risk specific to a body part, function or motion.

The calculated angles (simple angles and combination angles) can then be compared to one or more bodies of ergonomic assessment criteria in respect of a body part, function or motion. One non-limiting example of a suitable body of ergonomic assessment criteria is the Rapid Entire Body Assessment (REBA) standard, which is incorporated herein by reference. Detailed information about the REBA standard and the application thereof can be found, for example, at https://ergo-plus.com/reba-assessm_ent-tool-guide/, the teachings of which are hereby incorporated by reference. Other non-limiting examples of ergonomic assessment criteria include Ovako Working Posture Analysis System (OWAS) and the Rapid Upper Limb Assessment (RULA) described at https://ergo.human.cornell.edu/ahRULA.html, each of which are incorporated herein by reference. These are merely non-limiting examples, and any suitable ergonomic assessment criteria may be used.

Thus, for example, at step 110, if "right shoulder" is a predetermined feature (keypoint), the keypoint representing the right shoulder can be compared to adjacent keypoints so that its angle (angle of upper arm relative to torso) can be determined, and that angle compared to the ergonomic assessment criteria. An ergonomic risk factor can be identified, for example, if the angle of the right shoulder to the torso exceeds 90 degrees.

At optional step 112, the method 100 assigns a severity level to the ergonomic risk factor(s). The severity level may be assessed according to the same standard (e.g. REBA) used to identify the ergonomic risk factor(s). For example, the ergonomic risk associated with the combination of a bent back with straight knees is more severe than the ergonomic risk associated with the combination of a bent back with bent knees. Once assessed, the resulting severity risk level can be annotated at step 116 as described below; in addition overall ergonomic risk scores for each human form in the video sequence can be created based on the number of risk incidents and their severity. Step 110 and optional step 112 may be combined, depending on the implementation.

At step 114, the method 100 tracks movement of each human form within the scene, and at step 116, the method 100 superimposes a footprint on each of the images. These individual footprints combine to represent a location history of each human form within the workspace in the video sequence. The location history may be, for example, a motion trail or a heat map. Motion trails can be used to show the history of how a person has moved through a space by drawing a line connecting one or more keypoints for a detected human form through the images (frames) of the video sequence. FIG. 2A shows an image 200A with a relatively shorter motion trail 206A and FIG. 200B shows an image 200B with a relatively longer motion trail 206B; as noted above the image 200B in FIG. 2B is later in the video sequence than the image 200A in FIG. 2A, and hence the motion trail 206B in FIG. 2B includes and extends the motion trail 206A in FIG. 2A.

Heat maps are similar to motion trails. However, instead of connecting positions with lines, positions are tracked/accumulated over time. This allows for a visualization that indicates not only the history of positions, but also provides some indication of how long an object stayed in each location.

In one illustrative non-limiting embodiment, code from OpenCV (Open Source Computer Vision), may be used in motion detection; this code, which is incorporated by reference herein, is available at https://docs.opencv.org/3.0-beta/modules/core/doc/operations_on_arrays.html#cv2.absdiff. Although this code is for subtraction rather than specifically for motion detection, it can be useful for estimating motion where certain assumptions about the video sequence hold true (e.g. that the lighting is consistent). Other examples of code that may be used, with appropriate adaptation, to identity moving objects include https://docs.opencv.org/3.0-beta/modules/imgproc/doc/motion_analysis_and_object_tracking.html and https://docs.opencv.org/3.0-beta/modules/video/doc/motion_analysis_and_object_tracking.html as well as the "tensorflow" code available at https://github.com/tensorflow/tensorflow/blob/master/tensorflow/python/training/tracking/tracking.py.

Next, after the moving objects are identified, time-stamped frame-to-frame vector sequences representing movement of the identified moving objects within the scene are identified. Each identified moving object has its own vector sequence. In one embodiment, identifying the time-stamped frame-to-frame vector sequences representing movement of the identified moving objects within the scene may be carried out by, for each identified moving object, assigning a unique identifier to that moving object and associating a time-series of movement vectors for that moving object with the unique identifier for that moving object. For example, motion metadata may be stored on an image-to-image basis, with the motion metadata indicating the relative motion between the geographic positions of an identified moving object in successive image frames. These small vectors can be used later in generating and visualizing motion trails. The identified moving object can have its movement vectors recorded in a raw frame-to-frame method and later "smoothed" for a more realistic visualization upon generating the visual motion trail result.

Steps 106 and 110 may be carried out in parallel with steps 114 and 116, or steps 114 and 116 may be carried out before steps 106 and 110. Moreover, identification of human forms can be shared for both sets of steps.

Next, at step 118, for each ergonomic risk factor, the method 100 annotates the video sequence with the respective ergonomic risk factor at time of occurrence within the video sequence. At step 118, the annotation comprises a first annotation for the respective ergonomic risk factor that is associated with the respective human form in the video sequence, and further comprises a second annotation for the respective ergonomic risk factor that is associated with the respective location history in the video sequence. The terms "first" and "second" as used in this context merely distinguish the annotations, and do not imply any specific order; the annotations may be applied to the video sequence in any order or substantially simultaneously. Where a severity level is assigned to the ergonomic risk factor(s), at least one of the first annotation (human form annotation) and the second annotation (location history) include annotation of the severity level. For example, and without limitation, colour may be used both as the annotation itself, and as an indicator of severity. The annotation for the human form may be applied to the superimposed wireframe, or to the human form more generally, or both. In one embodiment, all or part of the wireframe and/or all or part of the human form may display a first colour (e.g. green) for low ergonomic risk, a second colour (e.g. yellow or amber) for moderate ergonomic risk, and a third colour (e.g. red) for high ergonomic risk. Similarly, where the location history is a motion trail, the portions of the motion trail associated with low ergonomic risk may display a first colour (e.g. green), the portions of the motion trail associated with moderate ergonomic risk may display a second colour (e.g. yellow or amber) and the portions of the motion trail associated with high ergonomic risk may display a third colour (e.g. red). Thus, the images in the video stream may be annotated not only where a substantial ergonomic risk exists, but also where there is little or no ergonomic risk. Areas of the wireframe or the human form associated with more ergonomic risk may be represented as being 'hotter' than other areas.

As noted above, FIGS. 2A and 2B show respective motion trails 206A, 206B with the image 200B in FIG. 2B being later in the video sequence than the image 200A in FIG. 2A such that the motion trail 206B in FIG. 2B includes and extends the motion trail 206A in FIG. 2A. The motion trail 206A in FIG. 2A, and hence also the motion trail 206B in FIG. 2B, can be seen to include respective annotations (second annotations) 208A, 208B for ergonomic risk factors associated with the respective location histories (motion trails 206A, 206B) in the video sequence where the respective ergonomic risk factors were instantiated.

Figure 2C:
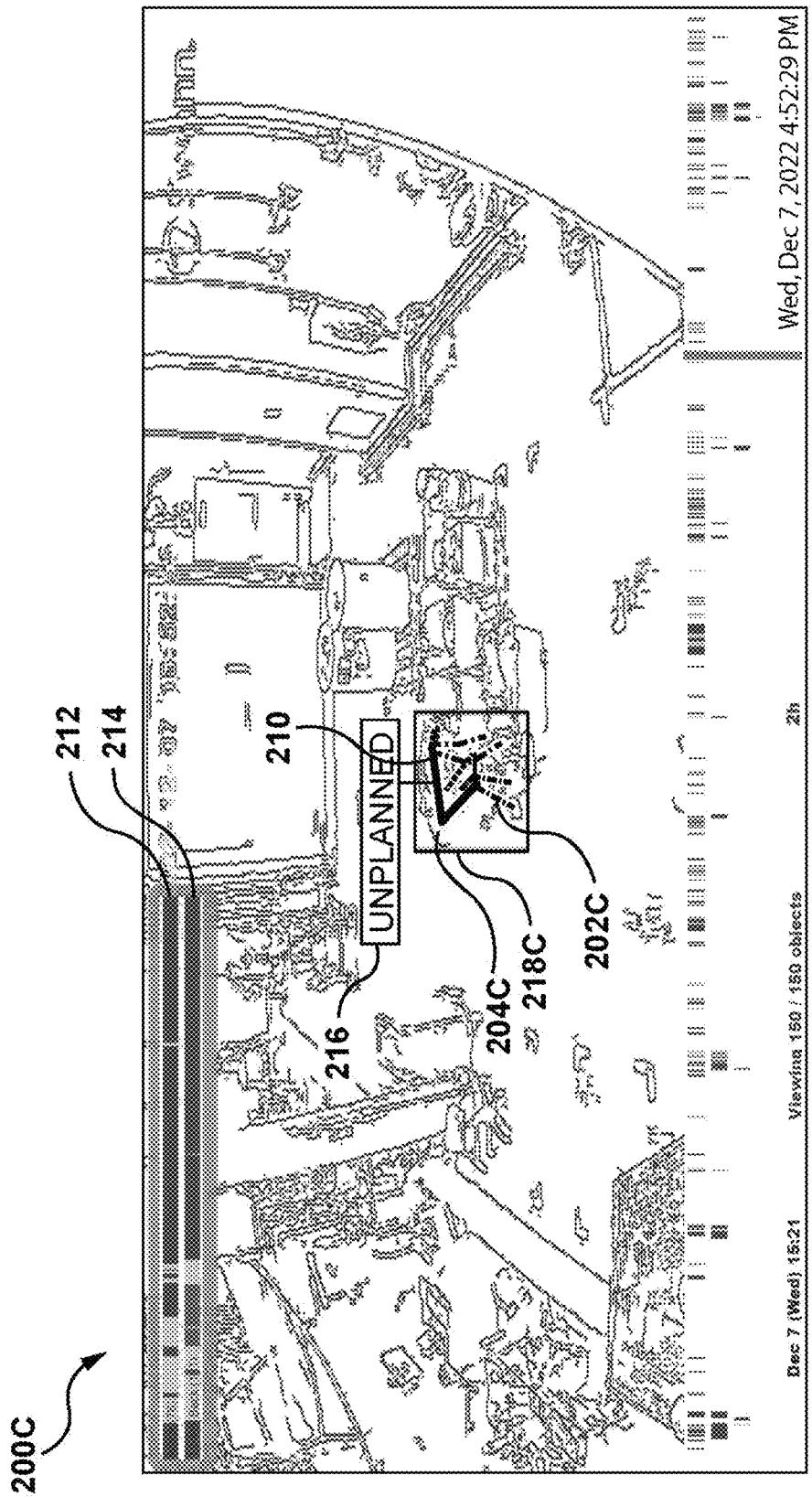

FIG. 2C shows another image 200C of the video sequence from FIGS. 2A and 2B processed according to the method 100 in FIG. 1. In FIG. 2C, a wireframe 202C is superimposed on the human form 204C, which represents the same individual represented by the human forms 204A, 204B in FIGS. 2A and 2B. The image 200C in FIG. 2C actually occurs earlier in the video sequence than the image 200A in FIG. 2A. In the image 200C, the wireframe 202C includes an annotation (first annotation) 210 in the form of thickened portions of the wireframe, displayed in a different colour, with both the color and the thickness serving to annotate the severity. The annotation 210 is a much-thickened portion of the wireframe 202C, which may be displayed in red, denoting a high ergonomic risk from a severe bend at the waist/lower back with little bend in the knees (an example of a combination angle). In FIG. 2C, no motion trail is visible because of the position of the human form 204C.

Of note, the annotations 208A, 208B in the respective motion trails 206A, 206B in FIGS. 2A and 2B record the same ergonomic risks that were annotated by the annotation 210 on the wireframe 202C in FIG. 2C.

FIGS. 2A, 2B and 2C each show bars 212, 214 in the upper left corner of the respective image 200A, 200B, 200C which highlight identified ergonomic risk factors for particular body regions. The uppermost bar 212 highlights identified ergonomic risk factors for the neck and the lowermost bar 214 highlights identified ergonomic risk factors for the lower back. These are merely illustrative examples and are not limiting; there may be other body regions, and there may be only a single body region and a single bar, or more than two body regions and more than two corresponding bars. Risk level may be indicated by colour (e.g. green is low risk, yellow is moderate risk and red is high risk), and the duration during which the risk level was extant may be indicated by the width of each segment of a particular colour. The longitudinal position within each bar 212, 214 indicates the temporal position within the video sequence where the identified ergonomic risk factor occurs, and the bars 212, 214 are in temporal alignment with one another to facilitate assessment of combined risk by juxtaposition of the bars 212, 214. Optionally, a specific portion of the video sequence can be selected by selecting (e.g. by mouse click) a position on one of the bars 212, 214. Conventional video controls (e.g. "play", "pause", "fast forward", "reverse", etc.,) may also be provided to control playback of the video sequence. Optionally, the images 200A, 200B, 200C may have superimposed thereon a respective framing border 218A, 218B, 218C highlighting the respective human form 204A, 204B, 204C; other types of highlighting may also be used.

The illustrated annotations are merely non-limiting examples, and a wide range of annotations may be used without departing from the scope of the present disclosure. Thus, for example, if at steps 110 and 112, the "right shoulder" angle were determined to be an ergonomic risk factor with high severity (e.g. raised above 90 degrees relative to torso), according to one illustrative annotation scheme, a red colour may be applied to the right shoulder of the human form (and/or the wireframe, if superimposed) in each of the image(s) in the video sequence where that ergonomic risk factor exists. The annotation scheme may also specify other annotations as well. For example, a text label (e.g. "SAFE" and/or "UNSAFE"; or "LOW RISK", "MODERATE RISK" or "HIGH RISK") could be associated with the respective human form in the video sequence in a way that does not obscure the relevant body region. In another example, in the images for which an ergonomic risk factor is identified may be annotated by pixelating (and hence obscuring) the human form and using colour to identify the body region(s) to which the identified ergonomic risk factor(s) relate. Multiple ergonomic risk factors may be annotated within the same image(s) of the video sequence. Motion trails and/or heat maps may be applied, for example, as obscuring annotations or as non-obscuring annotations, depending on the application. Motion trails and/or heat maps can be displayed for only the body regions/keypoints where there is an identified ergonomic risk, or for any keypoints or all keypoints. In a preferred embodiment, there is a single motion trail for each identified human form, as shown.

Returning now to FIG. 1, steps 102 through 118 may be carried out for any human form(s), including those of known individuals, for example workers or authorized guests, as well as unknown individuals within the scene. Known individuals can be identifed, for example, using image recognition applied to uniforms or ID badges, or ID badges with RFID, beacon or other locating technologies.

In cases where the human form(s) represent worker(s) or other individual(s) carrying out planned activities, the method 100 preferably carries out step 120 for at least one of the ergonomic risk factor(s) identified at step 110. At step 120 the method 100 compares the tracked movement of the respective human form (for example as determined at step 114) to a set of planned activities of the human represented by the respective human form and determines, from the comparison, whether the tracked movement of the respective human form is within the scope of the set of planned activities. Responsive to the determination at step 120, at step 122 the method 100 further annotates the video sequence to indicate whether the respective ergonomic risk factor occurred during unplanned activities. After step 122, the method 100 ends. FIG. 2C shows a third annotation 216 indicating that the ergonomic risk factor denoted by the first annotation 210 (thickened portion of the wireframe 202C in a different colour) occurred during unplanned activities. In some embodiments, only ergonomic risk factors occurring during unplanned activities may be expressly annotated as such, and where an annotated ergonomic risk factor does not have a specific "unplanned" annotation, it is implied that such annotated ergonomic risk factor occurred during planned activities. Step 120 may be carried out using a variety of techniques.

In one embodiment, a zone-based technique may be used. In one implementation, a zone-based technique may define prescribed zones where planned activities are expected to take place, and may optionally further define prohibited zones into which a human should not venture, lest calamity ensue.

Figure 3:
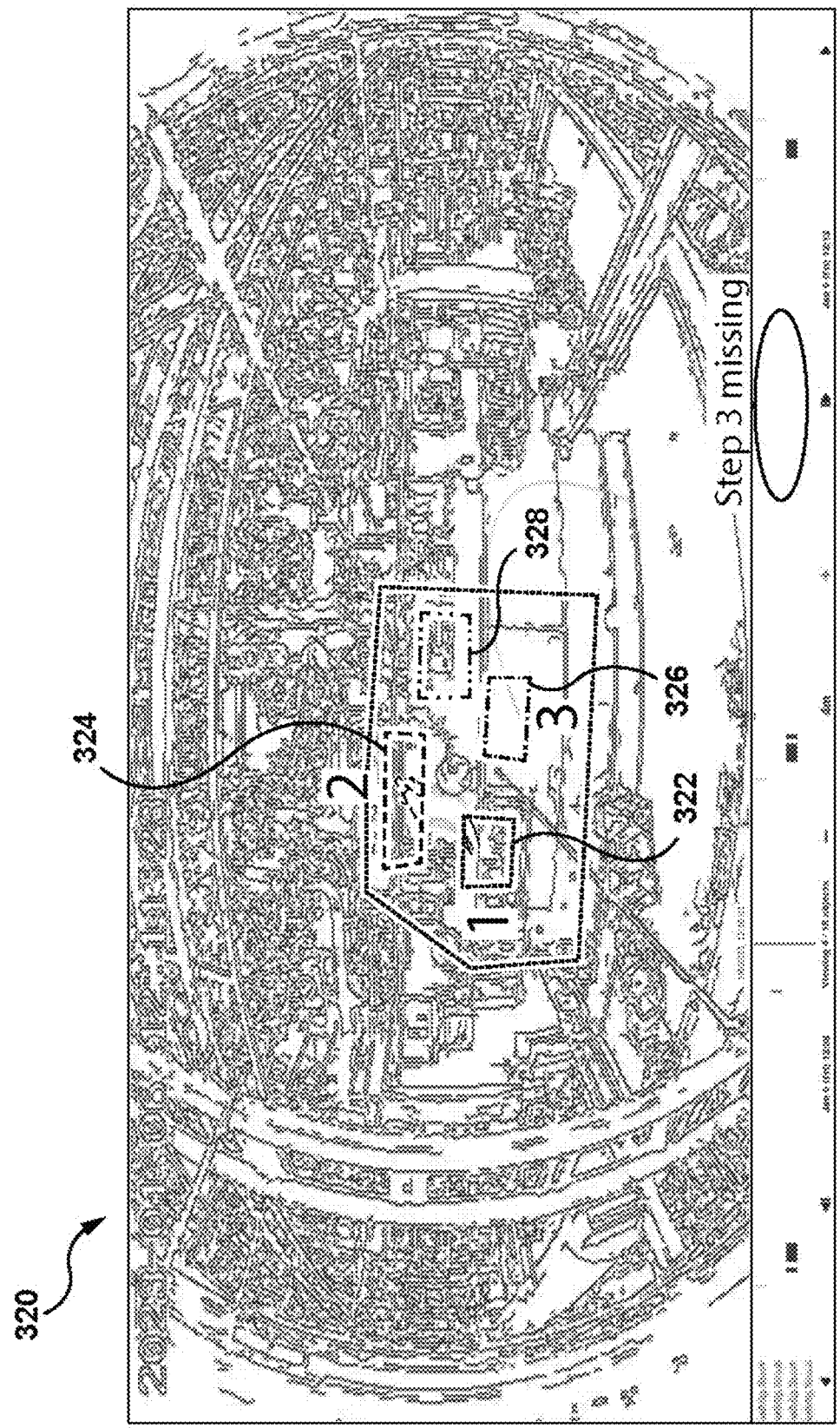
FIG. 3 shows an image of a scene with prescribed zones and a prohibited zone.

By way of non-limiting illustration, FIG. 3 shows an image of a scene 320. A user interface may enable pre-definition of prescribed zones and optional prohibited zones, for example by visually configuring polygon on a region of the image of the scene 320 to define zone boundaries. FIG. 3 shows four zones, namely a first prescribed zone 322 (large number "1"), a second prescribed zone 324 (large number "2"), a third prescribed zone 326 (large number "3"), and a prohibited zone 328. The large numbers "1", "2" and "3" define a planned (prescribed) order of operations for the prescribed zones 322, 324, 326.

In one aspect, the tracked movement of a human form is within the scope of the set of planned activities if the tracked movement of the human form takes the human form into and out of the prescribed zones 322, 324, 326 according to the prescribed order of operations. Thus, to be considered within the scope of the set of planned activities (i.e. planned), the tracked movement of the human form must first go into and out of the first prescribed zone 322, then into and out of the second prescribed zone 324, and then into and out of the third prescribed zone 326. Entering the prescribed zones 322, 324, 326 in a different sequence (i.e. wrong order), or omitting to enter one of the prescribed zones 322, 324, 326 (i.e. a missing step), would be considered outside the scope of the set of planned activities (i.e. unplanned). In another aspect, the tracked movement of a human form is outside the scope of the set of planned activities if the tracked movement of the human form takes the human form into the prohibited zone 328 at any time. Optionally, an additional annotation (e.g. a text label such as "DANGER") can be annotated to the video sequence where the tracked movement of the takes the human form into the prohibited zone 328. Thus, in one embodiment, the tracked movement of a human form is within the scope of the set of planned activities only if the tracked movement does not meet any of the criteria for being unplanned, i.e. all of the prescribed zones 322, 324, 326 are entered in the correct order and the prohibited zone 328 is not entered. Preferably, the specific deviations which caused the activities to be considered unplanned are identified for annotation. In some embodiments, the duration (dwell time within a prescribed zone 322, 324, 326 in the scene 320) may also be taken into account; e.g. there may be a planned duration, with a dwell time exceeding that being considered unplanned. Optionally, line crossing may be used as an alternative to, or in addition to, prescribed and/or prohibited zones.

Movement tracking for determining whether movement of a human form is within the scope of the set of planned activities can be implemented using the techniques described above, for example OpenCV or MoveNet, optionally with filtering to improve accuracy. Optionally, a bespoke machine learning model can be built, using labeled images fed as training data to a suitable machine learning engine, which can then be tuned using tuning data until satisfactory results are obtained. In one embodiment, sorting by comparison to pre-existing examples may be accomplished, for example, using supervised learning techniques taught at http://scikit-learn.org/stable/supervised_learning.html#supervised-learning, incorporated herein by reference. Where OpenCV is used, a decision tree may be used, which trades accuracy for improved runtime performance. The MoveNet approach is preferred for planned activities having greater specificity and hence requiring greater resolution, since the MoveNet approach enables tracking of limbs and extremities. For example, in some instances a planned activity may involve moving one's body to avoid reaching, such that the distinction between planned and unplanned will depend upon whether only an arm is in a particular prescribed zone (reaching=unplanned) or the arm and torso are in the prescribed zone (not reaching=planned).

As can be seen from the above description, the methods for generating ergonomics-annotated human forms and location histories in video sequences as described herein represent significantly more than merely using categories to organize, store and transmit information and organizing information through mathematical correlations. The methods for generating ergonomics-annotated human forms and location histories in a video sequence are in fact an improvement to the technology of automated computer-driven analytics for video surveillance, as these provide enhanced interface tools for a human reviewer to examine the behaviour of specific individuals in respect of specific incidents identified by automated processes. As such, the methods for generating ergonomics-annotated human forms and location histories in a video sequence are confined to automated computer-driven video surveillance analytics.

While certain open source software packages have been described as useful in implementing certain aspects of the present disclosure, it is to be understood that the present invention, as claimed, is directed not to any single step which may be known in the art, but to an inventive combination of steps producing the novel and useful result of generating ergonomics-annotated human forms and location histories in a video sequence. Moreover, while certain illustrative open source software packages have been described for the purposes of illustration and enablement, implementation of the present technology is not confined to the use of those examples; any suitable computer program code may be used, including open source, commercially licensed, and bespoke implementations.

The present technology may be embodied within a system, a method, a computer program product or any combination thereof. The computer program product May include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, other programmable data processing apparatus, or other devices to function in a particular manner, such that the instructions stored in the computer readable storage medium produce an article of manufacture including instructions which implement aspects of the functions/acts specified in the flowchart and/or block diagram block or blocks. The computer readable program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
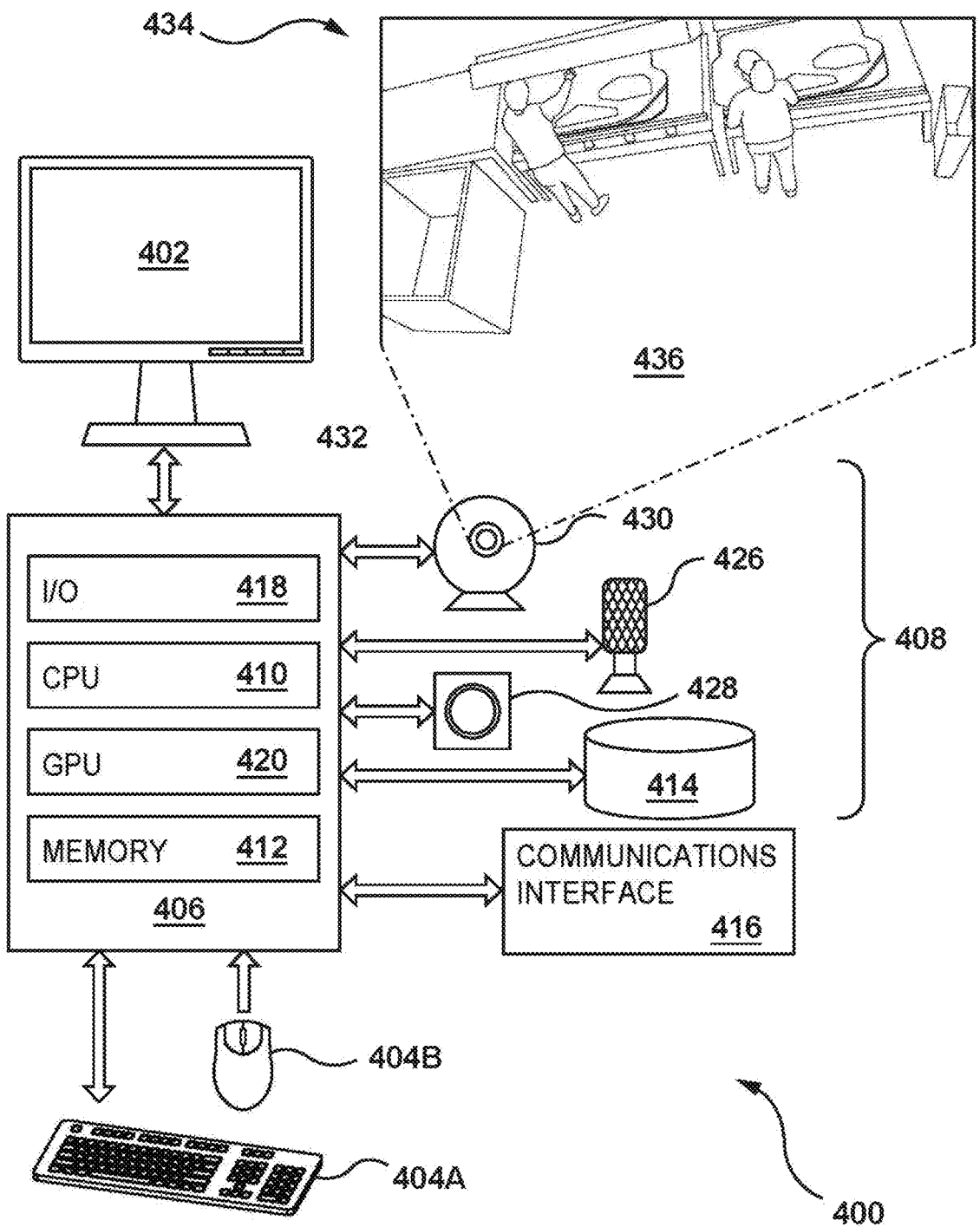
FIG. 4 shows an illustrative computer system that may be used to implement aspects of the method described in FIG. 1

An illustrative computer system in respect of which the technology herein described may be implemented is presented as a block diagram in FIG. 4. The illustrative computer system is denoted generally by reference numeral 400 and includes a display 402, input devices in the form of keyboard 404A and pointing device 404B, computer 406 and external devices 408. While pointing device 404B is depicted as a mouse, it will be appreciated that other types of pointing device, or a touch screen, may also be used.

The computer 406 may contain one or more processors or microprocessors, such as a central processing unit (CPU) 410. The CPU 410 performs arithmetic calculations and control functions to execute software stored in an internal memory 412, preferably random access memory (RAM) and/or read only memory (ROM), and possibly additional memory 414. The additional memory 414 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 4, or both.

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404A, external devices 408 and other such components of the computer system 400. The computer 406 also includes a graphical processing unit (GPU) 420. The latter may also be used for computational purposes as an adjunct to, or instead of, the (CPU) 410, for mathematical calculations.

The external devices 408 include a microphone 426, a speaker 428 and a camera 430. Although shown as external devices, they may alternatively be built in as part of the hardware of the computer system 400. The camera 430 may be used, for example, to capture a video stream 432 of a scene 434 of a workspace 436, to which the method 100 for generating ergonomics-annotated human forms and location histories in a video sequence may be applied.

The various components of the computer system 400 are coupled to one another either directly or by coupling to suitable buses.

One or more currently preferred embodiments have been described by way of example. It will be apparent to persons skilled in the art that a number of variations and modifications can be made without departing from the scope of the invention as defined in the claims.

I claim:

1. A computer-implemented method for generating ergonomics-annotated human forms and location histories in a video sequence, the method comprising:
receiving a video sequence comprising a plurality of images representing a scene;
analyzing the images to identify at least one human form of a respective human within the scene;
generating a body wireframe for each human form within the scene in each one of the images;
analyzing each body wireframe for each image to identify at least one ergonomic risk factor;
tracking movement of each human form within the scene;
for each human form within the scene, superimposing a respective footprint on each of the images, wherein the respective footprints combine to represent a location history of the respective human form within the workspace in the video sequence;
for each ergonomic risk factor, annotating the video sequence with the respective ergonomic risk factor at time of occurrence within the video sequence, wherein:
a first annotation for the respective ergonomic risk factor is associated with the respective human form in the video sequence; and
a second annotation for the respective ergonomic risk factor is associated with the respective location history in the video sequence.

2. The method of claim 1, further comprising:
assigning a severity level to the at least one ergonomic risk factor, wherein at least one of the first annotation and the second annotation include annotation of the severity level.

3. The method of claim 2, further comprising:
for at least one of the at least one ergonomic risk factor:
comparing the tracked movement of the respective human form to a set of planned activities of the human represented by the respective human form;
determining, from the comparison, whether the tracked movement of the respective human form is within scope of the set of planned activities; and
responsive to the determination, further annotating the video sequence with a third annotation to indicate whether the respective ergonomic risk factor occurred during unplanned activities.

4. The method of claim 1, wherein the video sequence is one of a real time video sequence and a previously stored video sequence.

5. The method of claim 1, wherein the video sequence is captured from a fixed angle.

6. The method of claim 1, wherein the location history is one of a motion trail and a heat map.

7. The method of claim 1, further comprising superimposing the body wireframe on each human form within the scene in each image.

8. A computer program product comprising a tangible computer-readable medium embodying instructions which, when executed by a data processing system, cause the data processing system to carry out a method for generating ergonomics-annotated human forms and location histories in a video sequence, the method comprising:
receiving a video sequence comprising a plurality of images representing a scene;
analyzing the images to identify at least one human form of a respective human within the scene;
generating a body wireframe for each human form within the scene in each one of the images;
analyzing each body wireframe for each image to identify at least one ergonomic risk factor;
tracking movement of each human form within the scene;
for each human form within the scene, superimposing a respective footprint on each of the images, wherein the respective footprints combine to represent a location history of the respective human form within the workspace in the video sequence;
for each ergonomic risk factor, annotating the video sequence with the respective ergonomic risk factor at time of occurrence within the video sequence, wherein:
a first annotation for the respective ergonomic risk factor is associated with the respective human form in the video sequence; and
a second annotation for the respective ergonomic risk factor is associated with the respective location history in the video sequence.

9. The method of claim 8, further comprising:
assigning a severity level to the at least one ergonomic risk factor, wherein at least one of the first annotation and the second annotation include annotation of the severity level.

10. The method of claim 9, further comprising:
for at least one of the at least one ergonomic risk factor:
comparing the tracked movement of the respective human form to a set of planned activities of the human represented by the respective human form;
determining, from the comparison, whether the tracked movement of the respective human form is within scope of the set of planned activities; and
responsive to the determination, further annotating the video sequence with a third annotation to indicate whether the respective ergonomic risk factor occurred during unplanned activities.

11. The method of claim 8, wherein the video sequence is one of a real time video sequence and a previously stored video sequence.

12. The method of claim 8, wherein the video sequence is captured from a fixed angle.

13. The method of claim 8, wherein the location history is one of a motion trail and a heat map.

14. The method of claim 1, further comprising superimposing the body wireframe on each human form within the scene in each image.

15. A data processing system comprising memory and at least one processor, wherein the memory contains instructions which, when executed by the at least one processor, cause the at least one processor to carry out a method for generating ergonomics-annotated human forms and location histories in a video sequence, the method comprising:
receiving a video sequence comprising a plurality of images representing a scene; analyzing the images to identify at least one human form of a respective human within the scene;
generating a body wireframe for each human form within the scene in each one of the images;
analyzing each body wireframe for each image to identify at least one ergonomic risk factor;
tracking movement of each human form within the scene;
for each human form within the scene, superimposing a respective footprint on each of the images, wherein the respective footprints combine to represent a location history of the respective human form within the workspace in the video sequence;
for each ergonomic risk factor, annotating the video sequence with the respective ergonomic risk factor at time of occurrence within the video sequence, wherein:
a first annotation for the respective ergonomic risk factor is associated with the respective human form in the video sequence; and
a second annotation for the respective ergonomic risk factor is associated with the respective location history in the video sequence.

16. The method of claim 15, further comprising:
assigning a severity level to the at least one ergonomic risk factor, wherein at least one of the first annotation and the second annotation include annotation of the severity level.

17. The method of claim 16, further comprising:
for at least one of the at least one ergonomic risk factor:
comparing the tracked movement of the respective human form to a set of planned activities of the human represented by the respective human form;

determining, from the comparison, whether the tracked movement of the respective human form is within scope of the set of planned activities; and responsive to the determination, further annotating the video sequence with a third annotation to indicate whether the respective ergonomic risk factor occurred during unplanned activities.

18. The method of claim 15, wherein the video sequence is one of a real time video sequence and a previously stored video sequence.

19. The method of claim 15, wherein the video sequence is captured from a fixed angle.

20. The method of claim 15, wherein the location history is one of a motion trail and a heat map.

21. The method of claim 15, further comprising superimposing the body wireframe on each human form within the scene in each image.

* * * * *